United States Patent [19]

Osada

[11] Patent Number: 4,952,104

[45] Date of Patent: Aug. 28, 1990

[54] METHOD OF FINISHING THE SURFACE OF A STRUCTURE

[76] Inventor: Hideharu Osada, 12-1, Tomiokita 2-chome, Nara-shi, Nara, Japan

[21] Appl. No.: 186,877

[22] Filed: Apr. 27, 1988

[51] Int. Cl.[5] .......................... B32B 7/00; D03D 3/00; D04H 1/00; E01C 11/06

[52] U.S. Cl. ...................................... 404/66; 52/127.2; 156/247; 156/289; 269/35; 427/264; 427/272

[58] Field of Search ............... 156/248, 344, 230, 247, 156/249, 246, 289, 298; 264/35; 427/154, 155, 156, 272, 264, 282, 259; 52/79.1, 79.11, 127.2, 127.1, 99, 105, 389, 390, 391; 404/66, 49

[56] References Cited

U.S. PATENT DOCUMENTS

| | | | |
|---|---|---|---|
| 1,701,629 | 2/1929 | Pullar | 404/66 |
| 3,667,174 | 6/1972 | Arnett | 52/100 |
| 3,853,576 | 12/1974 | Netznik | 427/154 |
| 3,892,892 | 7/1975 | Hofer | 427/272 |
| 4,448,800 | 5/1984 | Ehara et al. | 427/259 |
| 4,824,283 | 4/1989 | Belangie | 404/66 |

FOREIGN PATENT DOCUMENTS

| | | | |
|---|---|---|---|
| 607551 | 9/1948 | United Kingdom | 52/744 |

*Primary Examiner*—Michael W. Ball
*Assistant Examiner*—Louis Falasco
*Attorney, Agent, or Firm*—Darby & Darby

[57] ABSTRACT

A method of finishing the surface of a structure, which comprises fixing a rigid or elastic pattern member on a surface, with the pattern member including a releasable covering material applied thereto, applying a coating material to the surface and the member, removing the covering material, which is peelably attached on the surface of the pattern member, together with an uncured portion of the coating material placed on top of the pattern member, before the coating material is completely dried, and curing the coating material. In this way, the pattern member remains in the coating material as a joint, providing an attractive surface finish disposed within the coating material.

2 Claims, 7 Drawing Sheets

METHOD OF FINISHING THE SURFACE OF A STRUCTURE

BACKGROUND OF THE INVENTION

This invention relates to a method of finishing the surface of a structure such as a wall and road made for example from panels and boards. More particularly, the invention relates to a method of surface finishing to attain a utility effect adding a non-slip feature to a beautiful appearance a pattern member body, formed, in an as required configuration such as joint of a rigid material such as wood, metal, and china plate or an elastic material such as rubber and foamed polyethylene, with a coating material such as spraying material, wall material, and concrete.

Heretofore, a method of finishing with high-grade sight similar to tile hanging has been used, in which film or pattern paper punched in joint pattern is stuck on a wall surface or the like, and a convex-surface forming material is sprayed thereon. Then the pattern paper is peeled off. This largely increases the execution efficiency in comparison with the case where bricks or tiles are applied sticked one by one, but cannot give a thick convex surface with low convex-concave contrast. To solve such a drawback, the inventor has developed a method (Japanese Laid-open Patent Application No. 161774-1985) where a mold made of foamed polystyrene coated with a covering material for peeling is used and the mold member is removed by melting after the convex forming material is dried, and a method (Japanese Patent Application No. 89813-1984) where a foamed polyethylene or rubber member is used and removed by peeling after the convex forming material has been dried.

However, a coating material, which is uniform, leads to a monotonous finish, and when used on a road with deep joints, can cause an accident resulting in injury by catching high-heels or the tip of a cane. (This is similar to a case where bricks are laid without joint material.) When a rugged pattern is formed on a wall surface with a resin spray material, dust can adhere thereon leading to a dirty wall. Further, foamed polystyrene which is brittle must be removed dissolving with a solvent. This poses a hazard of ignition. Rubber or foamed polyethylene member are a to peeling off, Particularly, when the width of the joint is narrow and deep, making the joint member nearly impossible.

SUMMARY OF THE INVENTION

It is an object of this invention to provide a method of surface finishing which provides improved work efficiency, increased diversity and beautiful appearance while also providing and non-slip surface. This is accomplished by leaving these mold members on the worked face as pattern members.

To attain such an object, a pattern member of a rigid material or an elastic material processed in joint form, frame form, narrow plate form, letter/symbol form, and the like are covered with a covering material for releasing. The pattern member is fixed in specified positions on the surface, a coating material is then applied on the whole surface, and the covering material is removed together with the coating material adhered to the top surface, while the coating material is either wet or semi-dried, Providing a surface of the pattern member when made free of the covering material by peeling and exposing the cured coating material.

DETAILED DESCRIPTION OF THE INVENTION

Figure 1A:
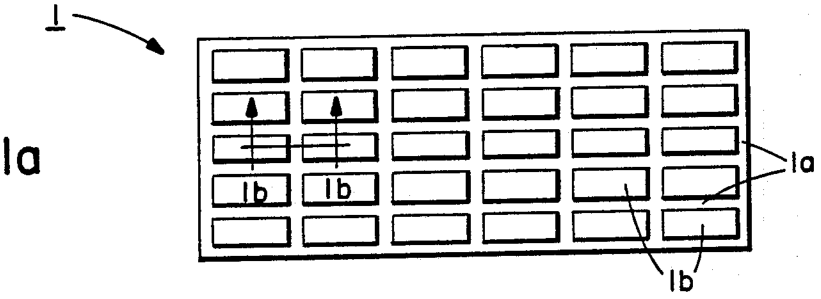
FIG. 1(*a*) is a plan view showing an embodiment of the pattern member used in the invention, FIG. 1(*b*) is an enlarged section along the line X—X in FIG. 1(*a*), FIG. 2(*a*)-(*e*) is an illustration of procedure of finishing the surface of a road with a spray material using the pattern member in FIG. 1 (*a*), (*b*), and (*d*) being sectional end views and (*c*) and (*e*) being perspective views, FIGS. 3 (*a*) and (*b*) are sectional end views showing other pattern members having different sections of joint sections, FIG. 3(*c*) is a sectional view of another embodiment of the pattern member.

The invention is hereinafter detailed based on the embodiments shown in the drawings.

Pattern Member

Figure 1B:
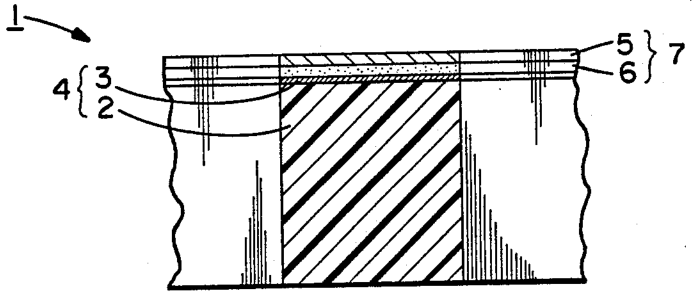

The pattern member (1) used in the invention and shown in FIG. 1 (*a*) and (*b*) comprises a pattern member body (4) made of a thick rubber sheet (2) patterned with a joint pattern with a release agent (3) applied on the surface. a covering material (5) is glued there to with an adhesive (6) applied to the back for later peeling.

The pattern member (1) is, after being pasted together with a rubber sheet which has received release treatment on the upper surface, and a coating thin plastic film with a releasable adhesive applied to the bottom surface, formed with unnecessary parts punched out by a punching machine, laser beam, or pressure water. In the drawing, symbol (1*a*) represents a joint pattern section and (1*b*) represents a punched out position. Or a rubber sheet and a plastic film punched out in a joint pattern in advance may be laminated together with an adhesive.

Execution Procedure

Figure 2A:
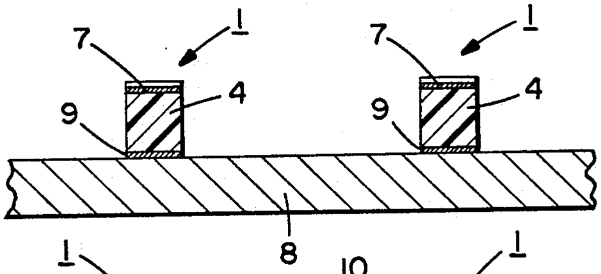
Figure 2B:
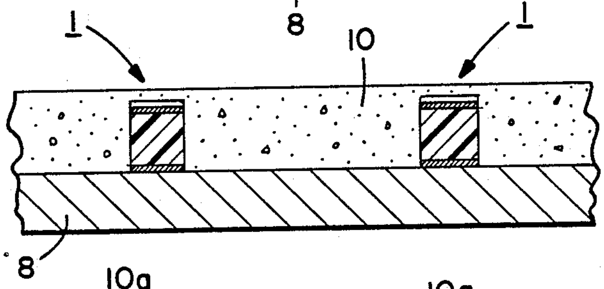
Figure 2C:
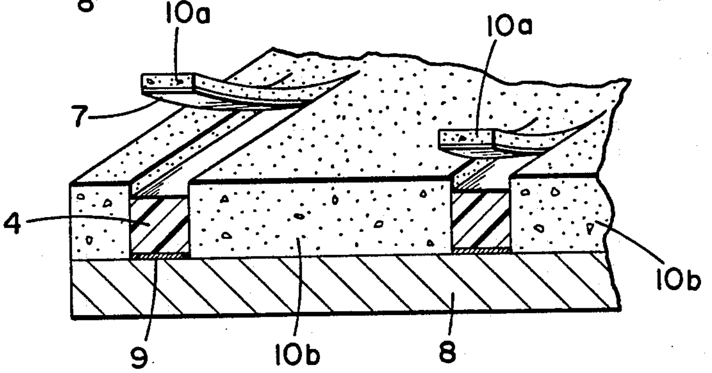
Figure 2D:
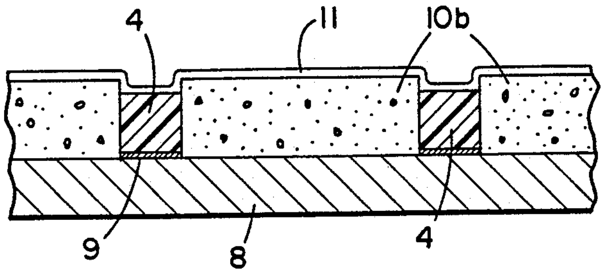
Figure 2E:
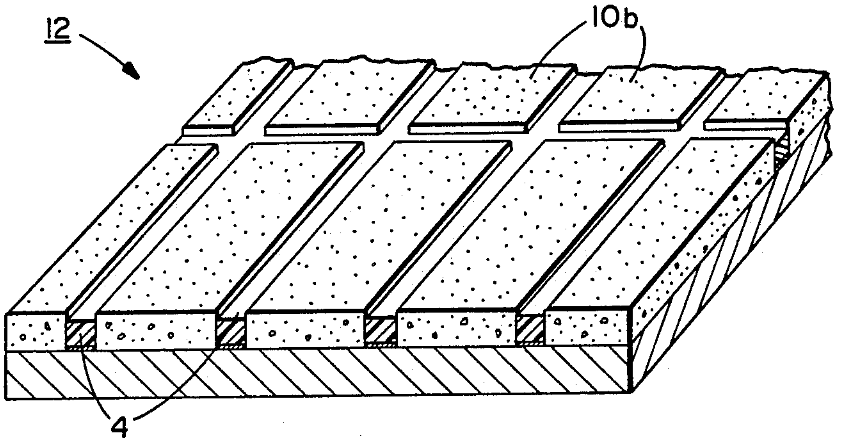

The procedure for finishing the surface of a structure or its raw material using the above pattern member (1) is hereafter described Referring to FIG. 2A. The pattern member (1) is fixed in a specified positions after a surface (8) of the road or passage has been made flat (through bed adjustment) as required The pattern member (1) is fixed with an adhesive (9) applied either to the back of the pattern member body (4) or to the specified positions on the road surface (8), or sprayed on the whole road surface (8). Where there is little fear of slippage and peeling, the pattern member may be fixed with a sticky material. When repairing a road surface (8) with concrete or asphalt, the pattern member (1) may be buried in concrete or asphalt for fixing while it is yet uncured.

Then, a spraying material (10) generally comprising an acrylic resin emulsion, is uniformly sprayed on the road surface as the coating material (FIG. 2(*b*)). The spraying quantity is about 4–50 kg/$m^2$ (about 2–20 mm as the thickness of the execution face) though depending upon the thickness of the execution surface, that is, the thickness of the pattern member body (4). It is preferable to make the thickness of the execution face thicker for the external wall surface and road surface, and thinner for the internal wall surface. The spraying thickness is to be flush with the pattern member (1) when the pattern member body (4) is used as a non-slip measure, and the spraying material (1) may be sprayed somewhat thicker when decoration is the main purpose. Also, the center portion of the pattern member (1) may be omitted in applying the spray material (10), not spraying on the whole surface. A quantity of powdered ceramics or natural stone may be admixed in the spraying material (10), giving higher strength and a feeling very much close to a natural material.

While the spraying material (10) is uncured (about one hour after spraying), the covering material is peeled off, as shown in FIG. 2(*c*). Thereupon the spraying material (10*a*) adhering on top of the pattern member body (4) is removed together, exposing a rubber surface.

After the remaining spray material (10*b*) has been satisfactorily dried and cured (after about 24 hr, for example) a transparent coating (11) of, for example, acrylurethane family is applied as required in uniform thickness on the whole surface at a rate of about 0.2–0.5 kg/$m^2$. This transparent coating (11) gives the spray material (10*b*) and the pattern member body (4) lustering, waterproofness, and durability. Thus, a spray coated road surface (12) with the joint section (A) of rubber and other parts (B) is finished in the color of spray material (10) is obtained.

Material and Modified Embodiment

The material of the pattern member body (4) may be foamed polyethylene or other elastic materials instead of the rubber sheet used in the above embodiment. For example, polypropylene, polyurethane, polyvinyl chloride, foamed copolymer of these with other resins, sliced foamed rubber, extruded moldings, and nonfoamed flexible plastics may also be used. They are mainly used on the road surface requiring for toughness, wear resistance, and durability. It is favorable to use those colored differently from the coating material (10). On the other hand, rigid materials such as wood, metal plate, and china plate are favorable to use in a wall surface or the like for producing a change. Rubber may be used on a wall surface, and wood may be used on a road surface to produce a soft feeling.

Figure 3A:
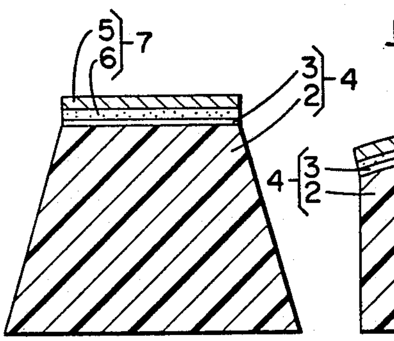
Figure 3C:
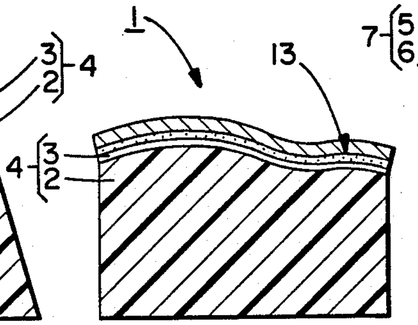
Figure 3B:
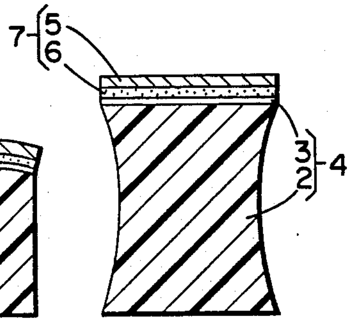
Figure 4:
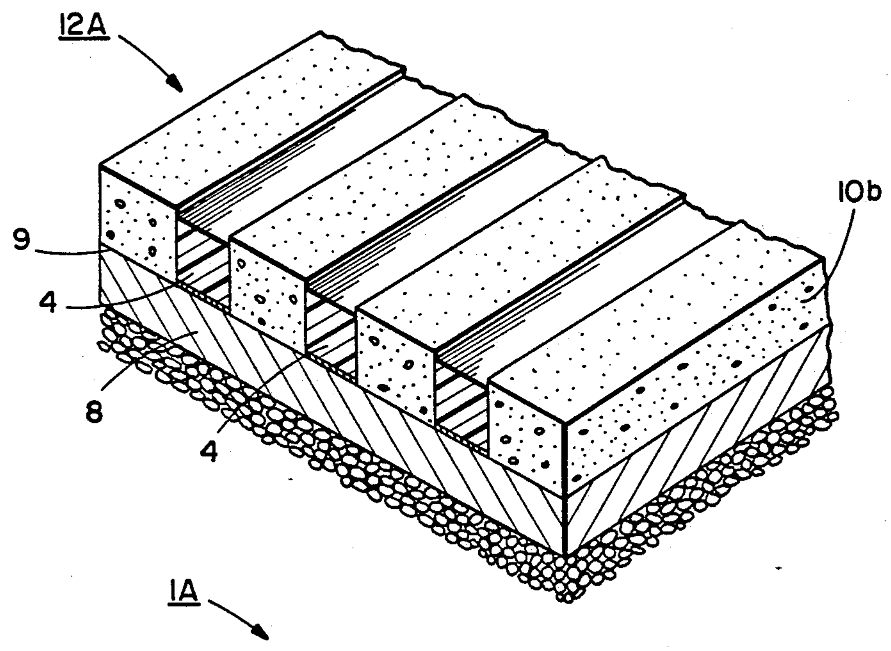
FIG. 4 is a perspective view showing another embodiment of the surface finish according to the invention, and FIGS. 5 (*a*), (*b*), (*c*), and (*d*) show other embodiments of the pattern member different from one another, (*a*) being a plan view and (*b*), (*c*), and (*d*) are perspective views.
Figure 5A:
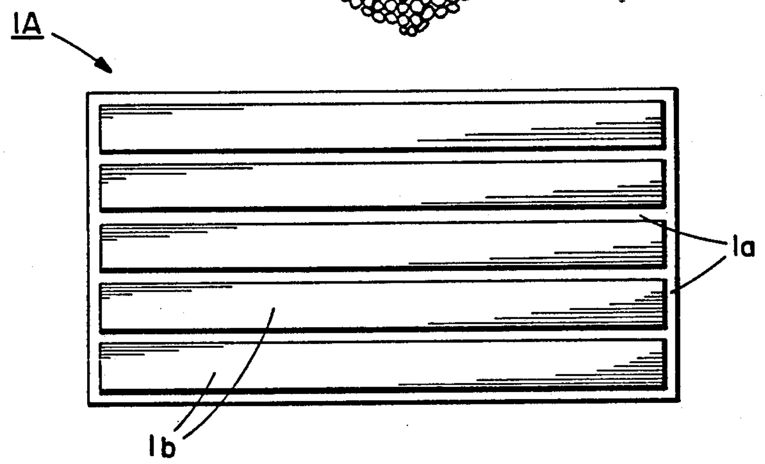
Figure 5B:
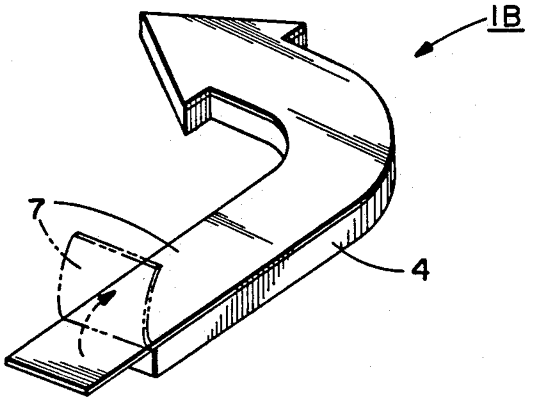
Figure 5C:
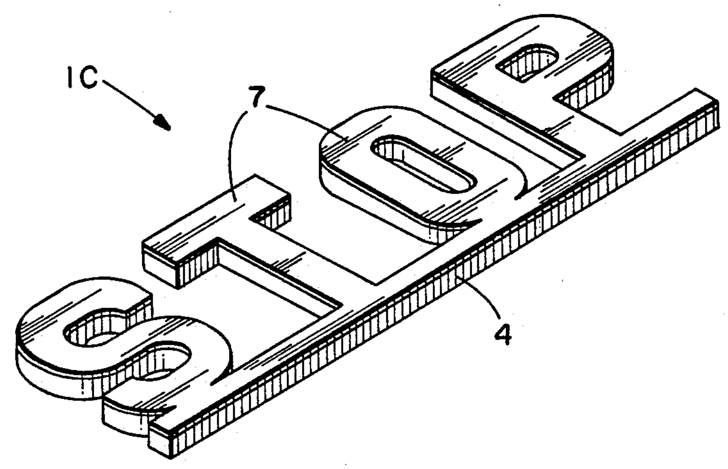
Figure 5D:
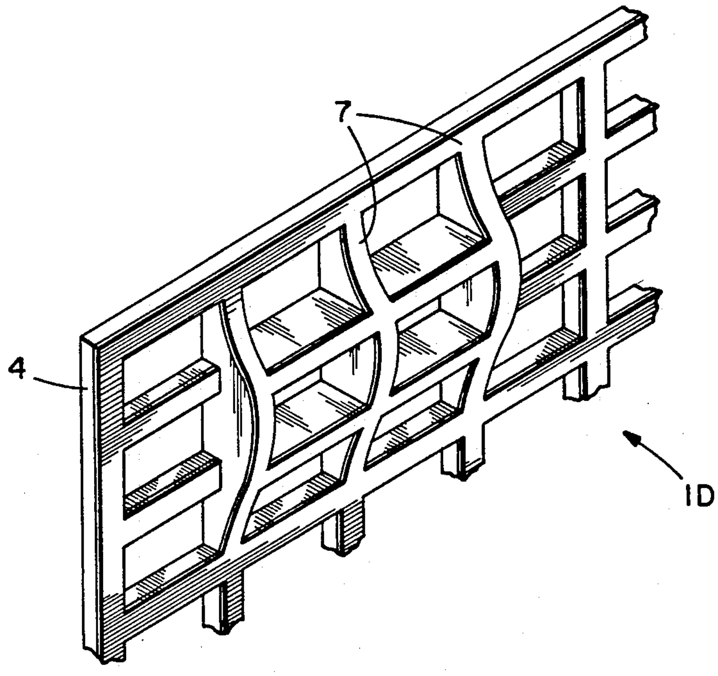

The configuration of the pattern member (1), that is pattern member body (4), is not limited to the above, as shown by the other exemplary configurations in FIG. 3 and FIG. 5. FIG. 3 (*a*) and (*b*) are sectional end views of joint pattern members (1). Such configurations prevent the pattern member body (4) from slipping out of the road or wall surface. FIG. 3(*c*) shows a pattern member body (4) of china plate with adhesive film (13) stuck thereon. FIG. 5(*a*) shows a pattern member body having punched sections which are long and narrow which are convenient in executing guide lines. Guide lines can also be formed by use of a pattern member body (4) of narrow plates. Guide posts of arrow type pattern member (1B) as shown in FIG. 5(*b*) and of letter type pattern member (1C) as shown in FIG. 5(*c*) are possible. In addition, those of frame form and figure form can also be used as required. However, a pattern member body (4) having some degree of continuity is favorable from the point of peeling off the covering material (7). In FIG. 5(*b*), a part of the covering material is projected ahead of the body 4 to facilitate its removal. Further, to make a relief pattern of joints, a joint pattern member (1D) with convex-concave portions molded or cut on one side as shown in FIG. 5(*d*) can be used.

As the covering material (7), various plastics films such as polyethylene, polypropylene, nylon, Tetoron, and PVC are favorably used. In addition, synthetic paper and cloths may be used.

This method can be applied to all inside and outside surfaces of structures such as wall, pillar, ceiling, floor, staircase, and surfaces of panels and boards constituting these structures, in addition to the above road surface. Outside wall surface or the like are preferably applied with a waterproof coating after bed adjustment to heighten the waterproofness. To prevent the adhesion of the pattern member body (4) from deteriorating due to waterproof coating in this case, two layers of the covering material (7) may be used; peeling off the first layer of the covering material after fixing the pattern member (1) and applying the waterproof coating, and peeling off the second layer of the covering material (7) after applying the coating material (10).

In addition to the above spraying material (10), organic resins such as epoxy and urethane, inorganic materials such as cement and mortar, troweling materials and wall materials, and any material applicable by spray gun, trowel, or roller can be used as the coating material.

EFFECT

In the present invention as described above, a pattern member of a rigid material or an elastic material processed in joint form, frame form, narrow plate form, letter/symbol form, and the like and covered with a covering material for releasing is fixed in specified positions on the surface, then a coating material is applied on the whole surface, and the covering material is removed together with the coating material adhered to the top, while the coating material is undried or semidried, to finish the surface of the structure or the material.

Thus, these positions are composed of those of texture, color, and hardness which differs from wood, metal, china plate, rubber unlike simple joint patterns and other concave-convex patterns, and brings a change and beautiful appearance to buildings and wall surfaces. The road surface finished by the method of the invention is safe, as it does not have any deep dents and various intelligible guide posts can be readily provided.

In addition, spraying and doweling permit easy formation of patterns as required configuration from various pattern members regardless of the type of desired surface. Since the execution is completed by a simple procedure, such as fixing the pattern member, applying coating material, and peeling the covering material on the pattern member, a large area can be executed at low cost, and attain unprecedented excellent effect.

What is claimed is:

1. A method for providing a surface on a road or a wall to provide a pattern in the surface comprising;
   providing a pattern member having a body with a covering material releasably disposed on a top surface thereof,
   disposing the pattern member on portions of the road or wall, applying a curable coating material in an uncured state over the road or wall and the pattern member, to a thickness sufficient to cover both the pattern member and the road of wall itself;

removing the covering material from the top surface of the pattern member, together with any uncured coating material thereover, leaving the pattern member body and remaining coating on the road or wall, and, curing by drying the remaining coating material.

2. A method of finishing the surface of a structure according to claim 1, further comprising the step of attaching a peelable covering material to the pattern member prior to placement of the member on the surface of the structure.

* * * * *